2,866,679
Patented Dec. 30, 1958

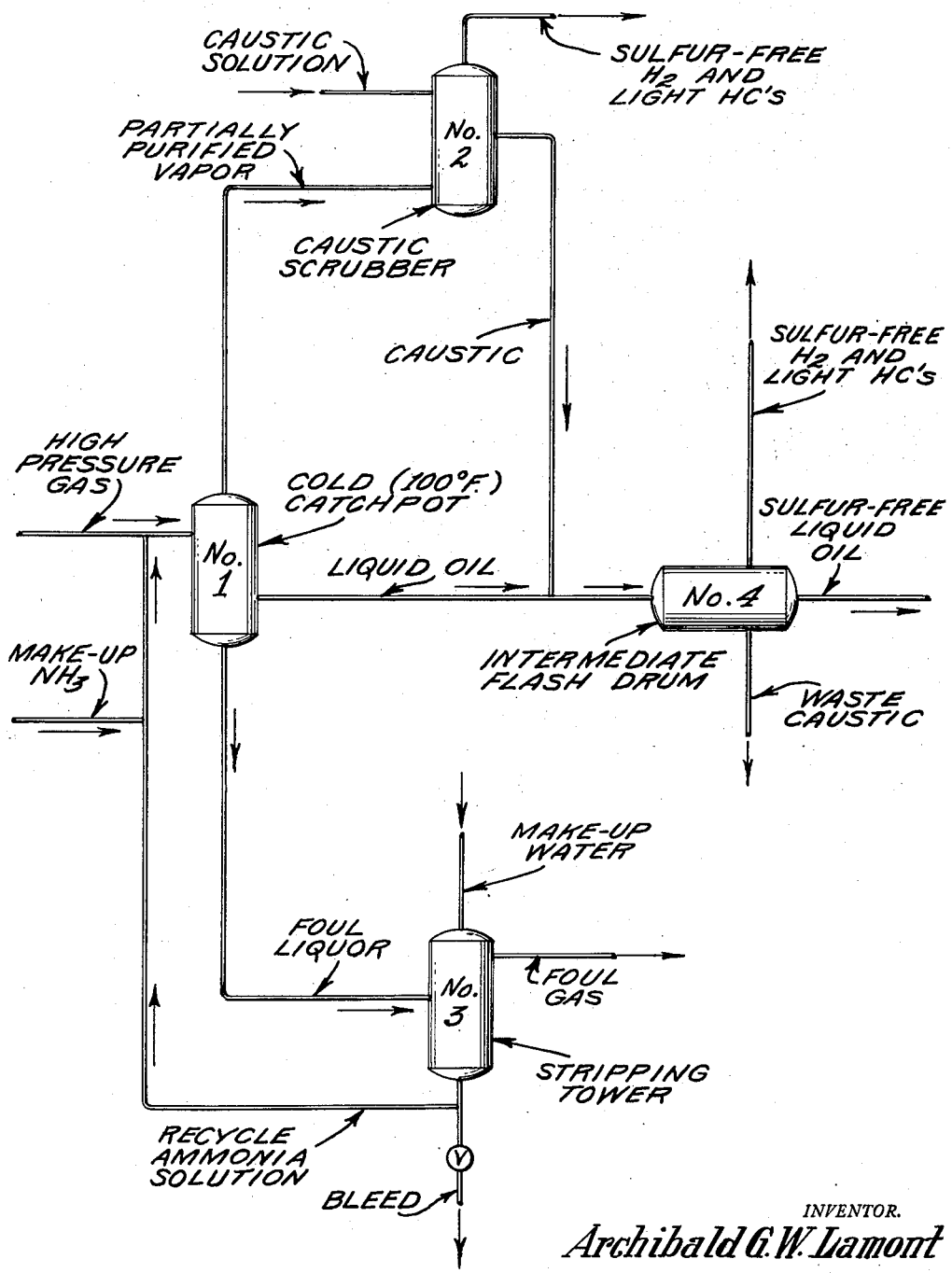

2,866,679
REMOVAL OF SULFUR FROM GAS STREAMS

Archibald G. W. Lamont, Toronto, Ontario, Canada, assignor to Houdry Process Corporation, Wilmington, Del., a corporation of Delaware Application February 10, 1955, Serial No. 487,393

1 Claim. (Cl. 23—3)

This invention relates to the removal of sulfur, particularly as hydrogen sulfide, from high pressure gas streams such as process streams in petroleum refining operations, in the gasification of coals and lignites, and from synthesis gas operations. It is particularly concerned with the purification of such gas streams by multiple treatment wherein economic factors are favorably combined with a completeness of purification.

The processing of heavy carbonaceous stocks such as petroleum residua and the like, particularly those high in sulfur and in nitrogen compounds, or in the gasification of coals and lignites, results in gas streams having relatively high contents of sulfur, usually present as hydrogen sulfide, and nitrogen, usually present as ammonia. Since it is desirable in most instances to utilize the gases resulting from these process steps either as recycle material for the processing of additional amounts of like materials or as process gas in other reactions such as reforming, synthesis, or the like, the purification of such gases is of considerable importance. In general, the presence of sulfur compounds and/or nitrogen compounds in processing gases is undesirable for any of a variety of reasons including the poisoning or inhibition of reactions or catalysts, the corrosion of equipment, or the introduction of extraneous and objectionable reactions leading to the production of compounds which are in themselves undesirable and add to the problems of purification of the desired products. Inasmuch as the processing of heavy petroleum stocks and the like is generally conducive to the production of relatively large amounts of gases, which are contaminated to a greater or lesser degree by the presence of sulfur and nitrogen compounds, the equipment, chemicals, and related matters in connection with the purification of such large volumes of gases assume an appreciable economic pattern of the over-all operation.

Heretofore the various available methods for the purification of such gas streams have made so much compromise because of economic reasons that the degree of purification and/or the quantities of gases so purified have been seriously reduced to approach a tolerable level. Inasmuch as no single purification system is available for the removal of acidic and basic type impurities simultaneously, it has been customary, when both types of impurities are designated for removal, to use multiple processing steps. In the event that only one type of impurity, such as the acid type impurity, is to be removed, no simple economic treatment is available for the substantially complete removal of such impurities; and the treatments necessary to effect substantially complete removal have been resorted to only in the event that a highly purified gas is absolutely necessary and thus justifies the relatively high expense of such purification.

This invention now provides a very effective and very economical means of treating large quantities of process gas of the type identified above. By the practice of this invention, it is possible to effect a high degree of purification of such process gases and to effect simultaneously the removal of both acid and basic types of impurities in the same system. This invention likewise utilizes at least a portion of these impurities to coact in effecting their own removal, thus saving to a marked extent the amounts of extraneous chemicals required in such a system. The method is relatively simple, quite economical, and quite effective in removing impurities in large degree such that the treated gases have a high state of purity which has been achieved at a moderate monetary outlay.

In accordance with this invention, acid gases are removed from high pressure, hydrocarbon type process gas streams containing the same by treatment with ammoniacal solution, effecting thereby neutralization of the bulk of such acid gases, and subsequently removing the neutralization products and, if any, excess ammoniacal solution. The residual traces of such acid gases are removed by treatment with a stronger basic treating agent, which is readily separable and removable from the treated gas stream. Effective removal of basic contaminants, particularly ammonium, is effected by utilizing such ammonium as part of the ammoniacal solution in the treatment of the process gas stream. Residual basic contaminants are generally removed in the separation and removal of the stronger basic treating agent.

A better understanding of the invention will be obtained by reference to the attached drawing and the description which follows.

The drawing attached hereto is a diagrammatic exposition of one system particularly adapted to the purification of high pressure gas from petroleum residua processing. It is to be understood that the system of the diagram is adapted to the simultaneous scrubbing of liquid and vapor phases by single-stage mixing with an aqueous phase, but is not intended to limit the invention to single-stage mixing; and that multiple-stage processing can be effectively utilized, particularly when the process gas streams are at relatively low pressures.

Ammonia solutions have been used for the recovery of hydrogen sulfide from coal gases since the earliest days of work with this type of material. The use of ammonia by itself has not been very effective because of the high dissociation pressure of ammonium sulfide. An attendant difficulty in the use of ammonia is that relatively large, and therefore, expensive amounts of ammonia are required to provide a sufficient driving force to maintain the ammonium sulfide and thus permit its removal. Likewise attendant in connection with the difficulties involved in the use of ammonia is that the water consumption can be excessive and therefore add to the cost of the removal process. For example, to reduce the sulfur content of a gas containing initially 1000 grains of sulfur per 100 cubic feet to 50 grains of sulfur per 100 cubic feet at atmospheric pressure and with a reasonable water consumption in the order of 50 gallons per MSCF (thousand standard cubic feet), there is required approximately 2 pounds of ammonia per MSCF of gas treated. The following table is illustrative of the several reasons why the use of ammonia alone has not been desirable in the purification of gases containing relatively large quantities of hydrogen sulfide because of the unfavorable equilibrium situations, Table I.—*Ammonia and water requirements for $H_2S$ removal*

[Basis: (1) Atmospheric pressure, 68° F. (2) Entering gas contains 1000 gr. S/100 cu. ft. (3) Single-stage system.]

| Residual S Content of Purified Gas, gr. S/100 cu. ft. | gal. $H_2O$ Used per MSCF. | lb. $NH_3$ Required per MSCF. | lb. $NH_3$ Used per lb. S Removed |
|---|---|---|---|
| 50 | 17 | 5.1 | 3.6 |
|  | 25 | 3.7 | 2.6 |
|  | 50 | 2.3 | 1.6 |
|  | 100 | 1.6 | 1.1 |
|  | 250 | 1.0 | 0.7 |
| 100 | 50 | 1.5 | 1.04 |
| 50 | 50 | 2.3 | 1.6 |
| 20 | 50 | 4.6 | 3.2 |

It is obvious from the above table that any reasonable reduction of sulfur in the gas is obtained only in the use of excessive amounts of water and/or ammonia.

It is to be noted, however, that the above data are based on atmospheric pressure operation. It can be shown that operation at elevated pressures, particularly in the order of 100 to 500 atmospheres, considerably enhances operation of the treating system in which ammonia is the treating agent. For example, the following table shows the effect of pressure on the ammonia requirements based on pressure operation of 3500 p. s. i. a.

Table II.—*The effect of pressure on ammonia requirements*

[Basis: (1) Entering gas contains 1000 gr. S/100 cu. ft. (2) Water rate 50 gal./MCSF. (3) 68° F. (4) Single-stage system.]

| Residual S Content of Purified Gas, gr. S/100 cu. ft. | Ammonia Requirement, lb. $NH_3$/lb. S Removed | |
|---|---|---|
|  | Atmospheric Pressure System | System at 3,500 p. s. i. a. |
| 100 | 1.04 | 0.50 |
| 50 | 1.6 | 0.50 |
| 20 | 3.2 | 0.51 |

The above data show that the effect of sulfur removal through water and ammonia is considerably enhanced by high pressure operation. However, in such high pressure operation the cost of pumping the water against high back pressure becomes an appreciable item of cost and is preferably avoided if possible.

In the high pressure system as in the preceding atmospheric system, costs rise with considerable rapidity as the tolerances for residual impurities decrease. As is shown in the following table, which is based on an entering gas containing a higher concentration of hydrogen sulfide, the water and ammonia requirements of high pressure operation are shown to be quite low.

Table III.—*Ammonia and water requirements for $H_2S$ removal (approx.)*

[Basis: (1) Entering gas contains 1450 gr. S/100 cu. ft. (2) 3500 p. s. i. a., 100° F. (3) Single-stage system.]

| Residual S Content of Purified Gas, gr. S/100 cu. ft. | gal. $H_2O$ Used per MSCF. | lb. $NH_3$ Required per MSCF. | lb. $NH_3$ Used per lb. S Removed |
|---|---|---|---|
| 50 | 6.3 | 1.5 | 0.75 |
|  | 13.0 | 1.2 | 0.62 |
| 100 | 13.0 | 1.1 | 0.56 |
| 50 | 13.0 | 1.2 | 0.62 |
| 20 | 13.0 | 1.6 | 0.80 |

However, it is to be noted that the production of a highly purified gas stream containing in the order of less than 10 grains of sulfur per 100 s. c. f. would require a high ammonia consumption or a very high water rate.

However, as one feature of this invention, these high ammonia and/or water requirements can be successfully avoided by utilizing ammonia scrubbing to effect a first-stage purification in which the requirements are relatively moderate in the amount of $H_2S$ to be removed; and subsequently treating the ammonia-treated gas with caustic soda scrubbing solution to effect removal of $H_2S$ to a high degree of purity. This treatment is about as effective and far more economical than steel wool treating, iron oxide box treatment, or other standard and well-known methods which effect substantially complete removal of hydrogen sulfide from hydrocarbon type process gas treatments.

Referring now to the single figure of the drawing, a description will be made in terms of purifying a process gas stream from the high pressure refining; i. e., hydrocracking, of a petroleum residuum stock. The effluent product from a hydrocracking reaction designed to process 2500 b. p. s. d. (barrels per stream day) is passed through heat adjusting means (not shown) to reduce the temperature from an outlet temperature of 870° F. to approximately 830° F. for entry into a first separator, or hot catchpot (not shown), where a preliminary liquid-vapor separation is effected. The effluent gas from the first separation at a pressure of 3360 p. s. i. a. (pounds per square inch, absolute) and a temperature of 830° F. is passed through a series of heat exchange members (not shown), whereby the temperature is reduced to 100° F., and is, thereafter, introduced as the gas stream identified in the drawing as High Pressure Gas into the separator identified in the drawing as vessel No. 1, the Cold Catchpot.

This high pressure gas stream contains approximately 384 parts of hydrocarbon vapors, 239 parts of hydrocarbon liquid, and about 8.96 parts of hydrogen sulfide. The gas stream, also, contains nitrogen (as ammonia) which with the recycle ammonia solution and additional extraneously introduced make-up $NH_3$ amounts to approximately 16.62 parts of $NH_3$. There is introduced with the recycle ammonia 500 parts of water and 2.6 parts of sulfur. The mixed high pressure gas stream thus contains approximately 500 parts of water and a total of 11.56 parts of sulfur entering the Cold Catchpot, designated as vessel No. 1 in the drawing. The entering pressure of this stream is approximately 3500 p. s. i. a. at 100° F.

The partially purified vapor is removed from vessel No. 1 and is passed by suitable means, designated as the line Partially Purified Vapor, to vessel No. 2, the Caustic Scrubber, wherein it passes in countercurrent and sulfur-removing relation with caustic solution containing about 46.4 parts of water and 0.5 part of NaOH. Other strength caustic solution, such as 10 weight percent or higher, may be used, but solutions of 0.5% and upward to about 3% are satisfactory and economically preferable. The sulfur-free gases comprising hydrogen and light hydrocarbons are taken overhead from the Caustic Scrubber in an amount approximately equal to 384 parts. The withdrawn side stream of the caustic solution containing the removed acid gas traces is introduced into the liquid oil stream coming from the Cold Catchpot, vessel No. 1, and is admixed in the line and then introduced into vessel No. 4, which is the Intermediate Flash Drum. The oil stream from the Cold Catchpot contains approximately 239 parts of liquid hydrocarbons and 0.22 part of hydrogen sulfide.

Withdrawn from the Cold Catchpot No. 1 is a bottoms stream containing substantially all of the hydrogen sulfide originally present in the high pressure gas stream introduced into the system. This bottoms stream, which can be identified as the foul liquor stream, contains approximately 499.6 parts of water, 11.2 parts of $H_2S$, and 16.6 parts of ammonia. This amount of sulfur is equivalent to the 95% of hydrogen sulfide from the liquor stream. The foul liquor stream is passed to vessel No. 3, which is a stripping tower where the temperature is raised to 212° F. and wherein the separation of the hydrogen sulfide from the ammoniacal solution is effected. A side stream, designated as Foul Gas, is withdrawn from the tower and which contains approximately 39.2 parts of water, 8.0 parts of hydrogen sulfide, and about 6.9 parts of NH$_3$. Make-up water amounting to 139.6 parts is added to the stripping tower and purified recycle ammoniacal solution is recovered and comprises 500 parts of water, 2.6 parts of hydrogen sulfide, and 8.1 parts of NH$_3$. As previously described, this recycle ammoniacal solution is admixed with the entering high pressure gas which in turn enters the Cold Catchpot, vessel No. 1. A minor amount of solution from the stripping tower No. 3 is withdrawn as a bleed solution and passed to waste. This bleed solution contains approximately 139.2 parts of water, 0.5 part of hydrogen sulfide, and 1.6 parts of ammonia.

As mentioned above, the liquid oil product from the Cold Catchpot No. 1, amounting to 239 parts and containing 0.2 part of hydrogen sulfide, is admixed with the caustic soda solution from the caustic soda scrubber, No. 2, and is then introduced into the Intermediate Flash Drum, designated as vessel No. 4. The traces of hydrogen sulfide present in the liquid oil from vessel No. 1 are removed by contact with the caustic soda solution, which is separated in vessel No. 4 and is withdrawn as a bottoms stream which is discarded. The side stream comprising the sulfur-free liquid oil product is withdrawn and is passed to such processing and storage as may be required and desired. The overhead stream comprising sulfur-free hydrogen and light hydrocarbons is withdrawn from vessel No. 4 and passed to admixture with the sulfur-free hydrogen and light hydrocarbon gas stream from the Caustic Scrubber, vessel No. 2, or may be sent to suitable other regions of the reaction system or be used as fuel as may be the more expedient.

By the foregoing treatment, there is thus recovered purified vapors amounting to about 384 parts and purified oil amounting to 239 parts of the total mixed stream originally introduced. Sulfur removal from the gas and the liquid streams is substantially complete as is the removal of nitrogen as ammonium hydroxide. The loss of treating solutions to waste is held to a relatively low level and the quantities of chemicals and water necessary to provide required amounts of solutions of the desired strength are likewise of desirably low level. These various savings coupled with the excellent removal of contaminants are unique in the field of gas purification. While in the foregoing discussion the amounts are described in terms of parts, they are readily transferred to practical quantities as by interpreting the quantities as moles per hour.

As previously indicated, the ammonia requirements for the process can be substantially reduced by utilization of ammonia already present in the gas from the processing of nitrogen-containing compounds present in the charge stock. Further reduction in ammonia requirements is obtained in the partial recovery and recycle of the ammonia which is in excess of that required to effect the preliminary reduction in hydrogen sulfide described immediately above. In general, the amount of ammonia which is introduced into the system is in the order of at least 2, and preferably 3 to 5, times that required for stoichiometric neutralization of the hydrogen sulfide in the gas stream. Greater amounts may be used but tend to increase the cost without any gain in efficiency. Inasmuch as the operation is facilitated by the presence of quantities of ammonia in excess of that required, recovering the ammonia with recycling therefore is distinctly advantageous to the economical operation of the system herein involved.

In connection with the separation of hydrogen sulfide and the like from the ammonia stream, which is to be utilized for recycling, it has been found that the hydrogen sulfide and ammonia can be removed from the foul liquor by raising the temperature to about the boiling point. While the hydrogen sulfide can be removed by blowing the foul liquor with air, this latter method results in undesirably high losses of ammonia, so that the method in which boiling is used is generally preferred. To be most economically attractive, the foul liquor is treated so as to have as little as possible ammonia leaving the solution and as much as possible hydrogen sulfide removed. Since the higher temperatures favor this balanced type of operation, regeneration by the boiling method is deemed preferable.

No exact amounts of make-up ammonia can be stated inasmuch as the make-up ammonia requirements to a great extent will depend on the ammonia content of the process gas stream and the replacement of processing losses. In fact, it is quite possible that extraneous ammonia may not be required at all, particularly when there is a fairly high concentration of ammonia in the process gas stream such as even less than 1 mole NH$_3$ per mole of hydrogen sulfide in the entering gas stream, inasmuch as the ammonia will tend to build up in the recycle liquor during operation.

A considerable amount of the foregoing discussion has been based on the removal of hydrogen sulfide and attendant removal of ammonia from a gas stream. It is to be understood that the system is applicable to the removal of acidic type gases generally similar to hydrogen sulfide, and to the removal of basic type gases similar in nature to NH$_3$. By this token, the removal of carbon dioxide is easily effected, and the various and sundry traces of phenol type materials will be removed from the process gas streams. The presence of appreciable quantities of acid gases in addition to the hydrogen sulfide in the gas stream will naturally require additional amounts of the basic treating agents to effect the removal, and by the same token, the presence of basic type materials in the process gas stream will reduce the requirements for the introduction of extraneous amounts of ammonia or similar neutralizing agents.

There is thus presented and described in considerable detail a two-stage process for removing acid gases and basic gases from process gas streams which are predominantly hydrocarbonaceous in nature.

Obviously many modifications and variations of the invention as hereinbefore set forth may be made without departing from the spirit and scope thereof, and therefore only such limitations should be imposed as are indicated in the appended claim.

I claim:

The method of treating a high pressure stream containing liquid hydrocarbons, a greater quantity of normally gaseous hydrocarbons, a minor quantity of basic nitrogen contaminants comprising ammonia and a minor amount of acidic sulfur contaminants comprising hydrogen sulfide which includes the steps of: cooling the stream to about 100° F.; contacting the cooled stream at high pressure with a stream of regenerated aqueous ammonium hydroxide solution in a first vessel to form a stream of contaminated aqueous ammonium hydroxide, a stream of liquid hydrocarbons, and a stream of gaseous hydrocarbons; withdrawing said stream of gaseous hydrocarbons and contacting with a stream of sodium hydroxide in a second vessel to form a stream of contaminated aqueous sodium hydroxide and a stream of desulfurized hydrocarbon gas; withdrawing from said first vessel said stream of contaminated aqueous ammonium hydroxide, and heating said stream in a third vessel to form a stream of said regenerated ammonium hydroxide and a stream of foul gas comprising steam, ammonia and hydrogen sulfide, said foul gas stream containing the predominant portion of the acidic sulfur contaminants of said high pressure stream; withdrawing from said first vessel said stream of liquid hydrocarbons and withdrawing from said second vessel said stream of contaminated aqueous sodium hydroxide and contacting said liquid hydrocarbon stream and said contaminated aqueous sodium hydroxide stream in a fourth vessel to form a stream of desulfurized liquid hydrocarbons and a stream of waste caustic solution.

References Cited in the file of this patent

UNITED STATES PATENTS

| | | |
|---|---|---|
| 1,360,734 | Doherty | Nov. 30, 1920 |
| 1,875,920 | Gordon et al. | Sept. 2, 1932 |
| 2,106,734 | Gollmar | Feb. 1, 1938 |
| 2,137,602 | Baehr et al. | Nov. 22, 1938 |
| 2,146,353 | Rosebaugh | Feb. 7, 1939 |
| 2,477,314 | Scharmann | July 26, 1949 |

FOREIGN PATENTS

| | | |
|---|---|---|
| 466,067 | Great Britain | Feb. 1, 1938 |